Dec. 12, 1961 S. H. BINGHAM 3,012,519
MONORAIL BEAM AND TRUCK DESIGN
Filed April 26, 1960

INVENTOR.
SIDNEY H. BINGHAM
BY Darby & Darby
ATTORNEYS

United States Patent Office 3,012,519
Patented Dec. 12, 1961

3,012,519
MONORAIL BEAM AND TRUCK DESIGN
Sidney H. Bingham, 109 E. 35th St., New York, N.Y.
Filed Apr. 26, 1960, Ser. No. 24,813
7 Claims. (Cl. 104—120)

This invention relates to improvements in monorail transportation systems with special reference to the truck and its combination with a monorail beam of I-beam section.

One object of this invention is to provide a truck assembly having running wheels which ride on the upper surface of the lower flange of an I-beam monorail.

Another object of this invention is to provide in addition switching wheels to adapt the trucks to transfer to regular railway trackage.

Still another object of the invention is to incorporate with the switching wheels additional rims positioned to ride on the upper surfaces of the lower flange of the I-beam when the running wheels are of the pneumatic type and suffer deflation.

Still another object of the invention is to provide in combination with the various arrangements described above guiding wheels aadpted to ride on the side edges of the upper flange of the I-beam.

A still more specific object of the invention is to provide journals for said guiding wheels arranged on converging axes to cooperate with the similarly converging side edges on the upper flange of the beam to raise the center of application of the guiding forces of the truck and thereby improve lateral stability of the truck assembly.

Other and more detailed objects of the inveniton will be apparent from the following description of the embodiments thereof illustrated in the attached drawings.

Figure 1:
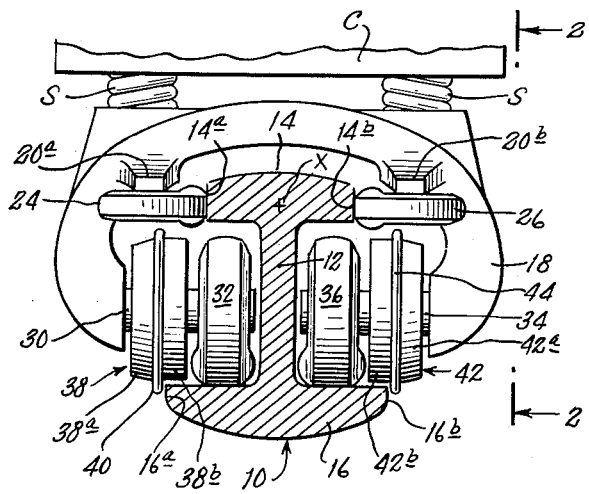
FIGURE 1 is an end elevational view of a monorail truck in accordance with this invention, illustrating its association with a monorail of I-beam section.

Generally this invention is concerned with improvements in the construction of monorail vehicle trucks and their combination with a particular form of monorail support to provide for substantial lateral stability of the truck assembly in operation. The system as disclosed is of the type in which the vehicle is supported above the monorail beam by the truck. Other objects are to provide means whereby the truck is interchangeable with the standard railway trackage system. Another important feature is to provide, in such systems where the running wheels are of the pneumatic type, for additional supporting wheels or rims cooperating with the monorail beam to support the truck in the case of deflation of the tires of the pneumatic running wheels. Still another feature is an arrangement of the beam structure and of guiding wheels rotatably mounted above the running wheels so as to improve lateral stability.

As illustrated in the drawings the subject matter of this invention involves particularly a monorail beam of I-shaped cross-section. This beam is illustrated generally by the reference character 10 and comprises a vertical web 12 having an upper horizontal flange 14 integral therewith, as well as a lower horizontal flange 16 also integral therewith. The detailed form of the section and its dimensions are such as to provide a suitable monorail for guiding and supporting transportation vehicles. As is obvious the beam 10 must be supported from below on columns.

As illustrated the truck consists of a frame which is generally of C-shape in end elevation and arranged to straddle the beam 10 from above. The exact configuration and details of construction of the frame 18 can be widely varied and can be extended longitudinally of the beam to carry additional sets of wheels, as will be apparent to those skilled in the art. This truck frame serves to support a car body C of any suitable construction and utility, by means of any form of supporting or suspension, such as the spring systems S diagrammatically illustrated.

The ends of the frame 18 are aligned on opposite sides of the web of the beam and are provided with a pair of studs 30 and 34 which are axially aligned and project from the frame 18 towards opposite sides of the web 12 of the beam. The studs can be integral with the frame or attached thereto in accordance with any suitable known mechanical constructions. Journaled respectively on the studs are the running wheels 32 and 36 which, as illustarted, are provided with pneumatic tires. The studs and wheels are arranged so that the wheels ride on the upper surfaces of the lower flange 16 of the monorail beam.

Journaled on the studs 30 and 34 respectively are a pair of flanged railway wheels 38 and 42 respectively, including the rims 38$^a$ and 42$^a$, flanges 40 and 44 respectively. These flanged wheels are journaled on the stubshafts outside of the running wheels and are positioned so that their flanges project so as to overlap the side edges 16$^a$ and 16$^b$ respectively of the lower flange 16 of the beam. Also mounted on the stubshafts and preferably integral with the flanged wheels are rims 38$^b$ and 42$^b$ positioned to drop down upon and ride upon the top faces of the lower flange 16 of the beam should one or both of the pneumatic tires of the running wheels become deflated. Thus these wheels or rims serve to support the truck in the event of a puncture. At the same time the flanges 40 and 44 act as a safety feature in the event of excessive overturning forces by reason of their engagement with the side faces of the lower flange.

Figure 2:
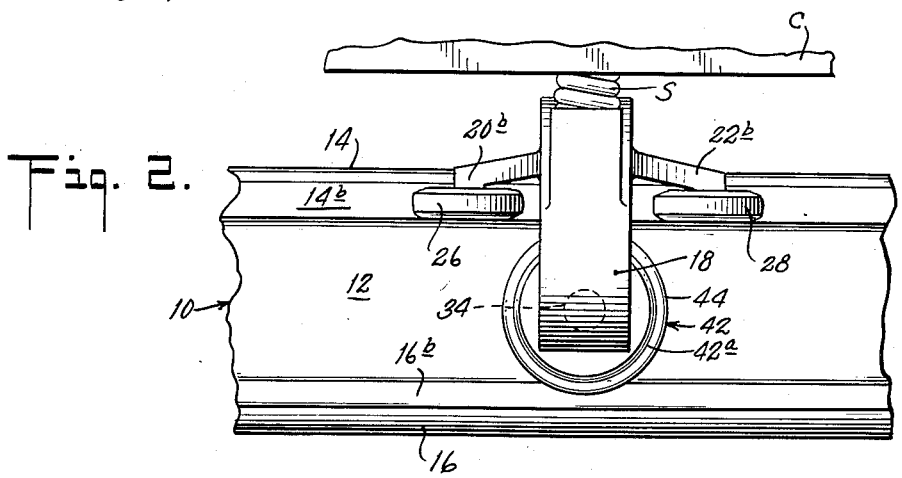
FIGURE 2 is a side elevational view of the structure of FIG. 1.

Additional lateral stability is imparted to the truck assembly by the provision of the guiding wheels 24, 26 and 28 and an additional similarly positioned wheel which does not appear in the figures. These guiding wheels are preferably of the pneumatic type and are arranged in pairs fore and aft of the frame, as illustrated in the case of the wheels 26 and 28 in FIG. 2. The wheels 24, 26 and 28 are respectively journaled on arms or brackets 20$^a$, 20$^b$ and 22$^b$ projecting fore and aft on and from the frame 18. A similar bracket is provided in alignment with the bracket 22$^b$ but not shown, for supporting the fourth guiding wheel, also not shown. These guiding wheels ride on the edge faces of the upper flange 14 of the beam, which faces are diagrammatically illustrated at 14$^a$ and 14$^b$.

Figure 3:
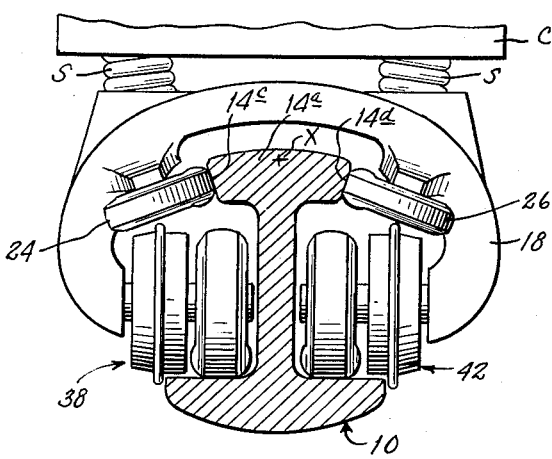
FIGURE 3 is a view similar to FIG. 1 of a modified construction with special reference to the shape and association of the guiding wheels with the upper flange of the monorail beam.

In the modification of FIG. 3, the system and assembly are generally the same as the previously described arrangement. The only difference is that the guiding wheels, two of which are shown at 24 and 26 in FIG. 3, are journaled on axes which converge downwardly so as to lie on inclined planes, as shown. The side edge faces 14$^c$ and 14$^d$ of the upper flange 14$^a$ of the monorail beam lie similarly in planes which converge downwardly, as shown. The result of this arrangement is to raise the center of application X of the guiding forces, that is the guiding level of the truck, thereby increasing the lateral stability of the entire truck assembly. That this point of application is raised as distinguished from the previous arrangement is apparent by reference to the relative positions of the point X in FIGS. 1 and 3.

In view of the above description of the embodiments of the invention disclosed in the drawings, it will be seen that the various objects set forth at the beginning

What is claimed is:

1. A monorail beam and vehicle truck combination comprising a monorail beam of I-beam section the edge faces of the upper flange of said beam lying in planes converging downwardly, a vehicle truck frame straddling said beam from above, a pair of aligned studs projecting from said frame on opposite sides of said beam, running wheels journaled on said studs and riding on the upper surfaces of the lower flange of said beam, and guiding wheels journaled on said frame on upwardly diverging axes and running on the edge faces of the upper flange of said beam to raise the center of application of the truck guiding forces.

2. In the combination of claim 1, said running wheels having pneumatic tires and a second pair of running wheels journaled on said studs and positioned to engage the upper faces of the lower flange of said beam when said tires are deflated.

3. In the combination of claim 1, said guiding wheels comprising pairs of wheels mounted fore and aft of said frame.

4. A monorail beam and vehicle truck combination comprising a monorail beam of I-beam section, a vehicle truck frame straddling said beam from above, a pair of aligned studs projecting from said frame on opposite sides of said beam, pneumatic tired running wheels journaled on said studs and riding on the upper surfaces of the lower flange of said beam, a second pair of running wheels journaled on said studs and positioned to engage the upper faces of the lower flange of said beam when said tires are deflated, flanges forming part of said second pair of running wheels positioned to engage the side faces of said lower flange under excessive turning forces, and guiding wheels journaled on said frame and running on the edge faces of the upper flange of said beam.

5. A monorail beam and vehicle truck combination comprising a monorail beam of I-beam section, a vehicle truck frame straddling said beam from above, a pair of aligned studs projecting from said frame on opposite sides of said beam, running wheels journaled on said studs and riding on the upper surfaces of the lower flange of said beam, guiding wheels journaled on said frame and running on the edge faces of the upper flange of said beam, and a pair of switching wheels journaled on said studs respectively for engagement with standard railway trackage.

6. In the combination of claim 5, said running wheels having pneumatic tires and said switching wheels having rims above the upper faces of said lower flange to normally hold out of engagement therewith when said tires are inflated.

7. In the combination of claim 5, said switching wheels having peripheral flanges overlapping the edge faces of said lower flange to resist excessive overturning forces and rims positioned to overlap the upper surfaces of said lower flange.

References Cited in the file of this patent

UNITED STATES PATENTS

| | | |
|---|---|---|
| 313,830 | Meigs | Mar. 10, 1885 |
| 891,882 | Valentine | June 30, 1908 |
| 953,352 | Smith | Mar. 29, 1910 |
| 1,196,402 | Simko | Aug. 29, 1916 |
| 2,045,299 | Hedgcock | June 23, 1936 |
| 2,168,986 | Harris | Aug. 8, 1939 |
| 2,182,057 | Chicoine et al. | Dec. 5, 1939 |
| 2,503,120 | Meyer | Apr. 4, 1950 |

FOREIGN PATENTS

| | | |
|---|---|---|
| 1,212,274 | France | Oct. 19, 1959 |